(12) United States Patent
Kobayashi

(10) Patent No.: US 9,276,519 B2
(45) Date of Patent: Mar. 1, 2016

(54) SECURING STRUCTURE FOR SOLAR CELL MODULE

(71) Applicant: Yanegijutsukenkyujo Co., Ltd., Takahama-shi, Aichi (JP)

(72) Inventor: Shuichi Kobayashi, Takahama (JP)

(73) Assignee: YANEGIJUTSUKENKYUJO CO., LTD., Takahama-Shi (JP)

( * ) Notice: Subject to any disclaimer, the term of this patent is extended or adjusted under 35 U.S.C. 154(b) by 0 days.

(21) Appl. No.: 14/589,438

(22) Filed: Jan. 5, 2015

(65) Prior Publication Data

US 2015/0107168 A1    Apr. 23, 2015

Related U.S. Application Data

(63) Continuation of application No. PCT/JP2012/068562, filed on Jul. 23, 2012.

(51) Int. Cl.
*H02S 20/23* (2014.01)
*F24J 2/52* (2006.01)
*E04F 13/08* (2006.01)

(52) U.S. Cl.
CPC .............. *H02S 20/23* (2014.12); *F24J 2/5245* (2013.01); *F24J 2/5258* (2013.01); *F24J 2/5264* (2013.01);

(Continued)

(58) Field of Classification Search
CPC . E04B 2001/2439; Y02B 10/12; Y02E 10/47; H02S 20/00; H02S 20/02; F24J 2/5245; F24J 2/5258; F24J 2/52583; F24J 2/5205; F24J 2/5264; F24J 2002/5215; F24J 2002/5226; F24J 2002/529
USPC ....................................................... 52/173.3
See application file for complete search history.

(56) References Cited

U.S. PATENT DOCUMENTS 3,995,804 A  * 12/1976 Folds ........................ F24J 2/23
                                                           126/569
5,571,338 A  * 11/1996 Kadonome ........... E04D 3/3608
                                                           136/251

(Continued)

FOREIGN PATENT DOCUMENTS

JP        2004-324181    * 11/2004
JP        2006-037545 A    2/2006

(Continued)

OTHER PUBLICATIONS

International Search Report (in English and in Japanese) for International Patent Application No. PCT/JP2012/068562 mailed on Aug. 14, 2012.

*Primary Examiner* — James Ference
(74) *Attorney, Agent, or Firm* — Yoshida & Associates, LLC

(57) ABSTRACT

A securing structure for a solar cell module installed on a roof of a building, having an external thread portion extending upward from a placement member, at least one flat plate-like shim member having a slit through which the external thread portion passes and a through-hole and stacked on the placement member, a flat plate-like connecting member placed on the shim member having an insertion hole through which the external thread portion passes, a droop portion drooping in the groove of the placement member through the through-hole, and a plurality of upward projecting portions projecting upward and sticking in the solar cell module and being made of an electrically conductive material, and a first securing member and a second securing member pressing downward on the solar cell module and the solar cell module placed on the connecting member with the external thread portion screwed into an internal thread portion.

4 Claims, 3 Drawing Sheets

(52) U.S. Cl.
CPC ......... *E04F 13/0814* (2013.01); *E04F 13/0828* (2013.01); *F24J 2/5205* (2013.01); *F24J 2002/529* (2013.01); *F24J 2002/5215* (2013.01); *F24J 2002/5226* (2013.01)

(56) References Cited

U.S. PATENT DOCUMENTS

| | | | | |
|---|---|---|---|---|
| 7,435,134 B2* | 10/2008 | Lenox | .................... | F24J 2/5245 439/567 |
| 7,592,537 B1* | 9/2009 | West | ..................... | F24J 2/5211 136/251 |
| 7,634,875 B2* | 12/2009 | Genschorek | ............. | F24J 2/045 403/331 |
| 7,758,011 B2* | 7/2010 | Haddock | ............. | E04F 13/0821 248/500 |
| 7,780,472 B2* | 8/2010 | Lenox | .................... | F24J 2/5211 136/251 |
| 7,797,883 B2* | 9/2010 | Tarbell | .................. | F24J 2/5205 248/237 |
| 7,956,280 B2* | 6/2011 | Kobayashi | ............. | F24J 2/5211 126/704 |
| 2002/0078657 A1* | 6/2002 | Zambelli | ................. | E04B 1/043 52/710 |
| 2003/0070368 A1* | 4/2003 | Shingleton | ............. | F24J 2/5205 52/173.3 |
| 2003/0101662 A1* | 6/2003 | Ullman | .................. | E04D 13/12 52/27 |
| 2005/0115176 A1* | 6/2005 | Russell | ................. | E04D 3/3608 52/220.1 |
| 2006/0118163 A1* | 6/2006 | Plaisted | ................. | F24J 2/5207 136/251 |
| 2006/0156648 A1* | 7/2006 | Thompson | ............. | F24J 2/5245 52/173.3 |
| 2008/0010915 A1* | 1/2008 | Liebendorfer | ......... | F24J 2/5205 52/173.3 |
| 2008/0053008 A1* | 3/2008 | Ohkoshi | ................ | F24J 2/5205 52/173.1 |
| 2008/0087275 A1* | 4/2008 | Sade | ...................... | F24J 2/5235 126/623 |
| 2009/0019796 A1* | 1/2009 | Liebendorfer | ......... | F24J 2/5207 52/173.3 |
| 2009/0025314 A1* | 1/2009 | Komamine | ............ | F24J 2/5207 52/173.3 |
| 2009/0250580 A1* | 10/2009 | Strizki | ................... | F24J 2/5207 248/309.1 |
| 2010/0088996 A1* | 4/2010 | Thompson | ............. | F24J 2/5245 52/704 |
| 2010/0192505 A1* | 8/2010 | Schaefer | ................ | A47B 96/14 52/653.2 |
| 2010/0276558 A1* | 11/2010 | Faust | ..................... | F24J 2/5205 248/222.14 |
| 2010/0307074 A1* | 12/2010 | Stearns | .................. | E04D 13/10 52/173.1 |
| 2011/0047903 A1* | 3/2011 | Kobayashi | ............ | F24J 2/5211 52/173.3 |
| 2011/0120047 A1* | 5/2011 | Stearns | .................. | E04D 13/10 52/698 |
| 2011/0162779 A1* | 7/2011 | Stanley | ................ | F24F 3/0442 156/66 |
| 2011/0179727 A1* | 7/2011 | Liu | ....................... | F24J 2/5203 52/173.3 |
| 2011/0214365 A1* | 9/2011 | Aftanas | ................. | F24J 2/5258 52/173.3 |
| 2011/0214368 A1* | 9/2011 | Haddock | ................ | F24J 2/5249 52/173.3 |
| 2011/0239554 A1* | 10/2011 | Tsuzuki | .................. | F24J 2/045 52/173.3 |
| 2011/0297808 A1* | 12/2011 | Yamanaka | ............. | F24J 2/4614 248/237 |
| 2011/0302857 A1* | 12/2011 | McCellan | ........... | E04D 13/0445 52/173.3 |
| 2012/0073220 A1* | 3/2012 | Kobayashi | ................ | E04D 1/30 52/173.3 |

FOREIGN PATENT DOCUMENTS

| | | |
|---|---|---|
| JP | 2006-144266 A | 6/2006 |
| JP | 2010-261257 A | 11/2010 |
| JP | 4906966 B1 | 9/2012 |
| WO | 2011/096107 A1 | 8/2011 |

* cited by examiner

SECURING STRUCTURE FOR SOLAR CELL MODULE

CROSS REFERENCE TO RELATED APPLICATIONS

This application is a continuation of International Application No. PCT/JP2012/068562 filed on Jul. 23, 2012, of which full contents are incorporated herein by reference.

BACKGROUND OF THE INVENTION

1. Field of the Invention

The present invention relates to a securing structure for a solar cell module for installing the solar cell module on roof.

2. Description of the Related Art

Various securing structures for installing a solar cell module on roof have been proposed (see, Japanese Patent Application Laid-open Nos. 2006-037545 and 2006-144266). In the securing structures, a plurality of long vertical crosspieces are secured onto a roof material such as roof tiles and slate so as to extend in the roof inclination direction (also referred to as flow direction) at an interval in the roof lateral direction. Then, a plurality of long lateral crosspieces are secured onto these vertical crosspieces so as to extend in the roof lateral direction at an interval corresponding to the length of the short sides of the solar cell module. In such a manner, a mounting mount in a form of parallel crosses is formed. Then, the long sides of the solar cell module are placed and secured onto the lateral crosspieces of the mounting mount.

In the securing structures as described in Japanese Patent Application Laid-open Nos. 2006-037545 and 2006-144266, the mounting mount is formed in the form of parallel crosses. This requires a large number of crosspiece members and increases the number of parts, resulting in a problem that the cost for installing the solar cell module is increased.

For solving this problem, the present applicant has proposed the following securing structure (see, Japanese Patent Application Laid-open No. 2010-261257). In the securing structure, a plurality of long crosspiece members are secured in parallel onto a roof material and fastening members are supported on the crosspiece members so as to slide in the extending direction thereof. Further, a solar cell module is placed on the plurality of crosspiece members such that a pair of opposing sides of the solar cell module intersect with the crosspiece members. Then, the solar cell module is pressed to the crosspiece members to be secured by securing members through the fastening members supported on the crosspiece members.

With this structure, the solar cell module is directly secured onto the long crosspiece members secured onto the roof material. This eliminates necessity for arranging the crosspiece members in the form of parallel crosses to configure the mounting mount. Therefore, the number of parts for installing the solar cell module can be reduced, thereby reducing the cost.

Meanwhile, in Japanese Patent Application Laid-open Nos. 2006-037545, 2006-144266, and 2010-261257, in order to achieve a state where the upper surfaces of a plurality of solar cell modules are aligned in the same plane, when the plurality of long crosspiece members (vertical crosspieces) are secured in parallel onto the roof material, they are secured such that the upper surfaces of the respective crosspiece members are aligned in the same plane parallel with the surface of roof. That is to say, the plurality of long crosspiece members are secured while making adjustment of aligning the upper surfaces of the plurality of crosspiece members to the same height from the surface of the roof. There is, however, a problem that the adjustment of the heights of the plurality of crosspiece members requires mature techniques and troublesome tasks. Further, when the adjustment is insufficient, the upper surfaces of the plurality of solar cell modules placed on the crosspiece members are not in the same plane and are in an uneven state. This arises a problem that appearance is unattractive and there is a risk that the solar cell modules bend and are broken when the solar cell modules are secured onto the crosspiece members. The adjustment of the heights referred herein also includes adjustment of aligning the upper surfaces of the plurality of solar cell modules to be in the same plane and adjustment of parallelism between the upper surfaces of the solar cell modules and a specific surface (for example, the surface of the roof or an optimum arrangement surface based on latitude of an installing place).

On the other hand, when the plurality of solar cell modules are installed on the roof, the solar cell modules are required to be grounded. When the respective solar cell modules are grounded separately, grounding conductors by the number of solar cell modules are required to extend to the ground from the roof. This arises problems that wiring becomes cumbersome and troublesome tasks are needed. For avoiding the problems, grounding terminals are screwed on frame bodies of the respective solar cell modules, which are made of metal, and the terminals are connected through a wire cable so as to connect the respective solar cell modules to each other. Then, the grounding conductor is made to extend from one solar cell module to the ground, a construction made of metal, or the like.

In this case, holes are opened on the frame bodies of the solar cell modules for screwing. This arises a risk that devices in the solar cell modules are damaged depending on screwing positions. In addition, hole parts are exposed to wind and rain because the holes are opened on the frame bodies of the solar cell modules. Therefore, there is a risk that the frame bodies with the hole parts become easy to be corroded and durability of the solar cell modules is lowered due to the corrosion of the frame bodies.

In order to solve this, Japanese Patent Application Laid-open No. 2006-144266 has proposed the following technique. That is, protrusions sticking in the upper surfaces of the frame bodies of the solar cell modules are provided on a pressing member made of metal, which presses down the pair of solar cell modules placed on the lateral crosspieces from above simultaneously to secure them. This causes the solar cell modules to be connected electrically each other through the pressing member. However, in the technique in Japanese Patent Application Laid-open No. 2006-144266, rainwater is easy to be accumulated on portions in which the protrusions stick because the protrusions for grounding are made to stick therein from above the solar cell modules. When electric current flows between the protrusions and the solar cell modules (frame bodies) in a state where water is accumulated on the portions in which the protrusions stick, there arises the following risk. That is, electric corrosion is generated on the portions and durability of the solar cell modules is lowered due to the corrosion of the frame bodies.

SUMMARY OF THE INVENTION

In view of the above circumstances, an object of the present invention is to provide a securing structure for a solar cell module, which can make adjustment of aligning height of the upper surface of the solar cell module easily and can make the solar cell module be grounded in a preferable state.

In order to achieve the above-mentioned object, a securing structure for a solar cell module according to an aspect of the invention "includes a placement member installed on roof and having a groove extending in one direction in an upper surface; an external thread portion extending upward through the groove of the placement member; at least one flat plate-like shim member having a slit opened to one side in the direction that the groove through which the external thread portion passes extends and a through-hole penetrating through the shim member at a side opposite to the slit, and stacked on the upper surface of the placement member; a flat plate-like connecting member placed on an upper surface of the shim member, having an insertion hole through which the external thread portion passes, a droop portion drooping in the groove of the placement member through the through-hole of the shim member at an outer side relative to the insertion hole, and a plurality of upward projecting portions projecting upward from positions separated in the direction that the groove extends with respect to the insertion hole and sticking in a lower surface of the solar cell module placed so as to be separated from the external thread portion in the direction that the groove extends, and having electrical conductive property; and a securing member abutting against an upper surface of the solar cell module placed on the connecting member, and pressing downward the solar cell module with screwing between the external thread portion and an internal thread portion."

Examples of the "one direction" that the "groove" extends can include "roof flow direction", "roof lateral direction (direction perpendicular to the flow direction)", and "direction parallel with the surface of the roof other than the roof flow direction and the roof lateral direction". Further, as examples of a relation between the direction that the groove extends and the placement member, "an extruding direction of the placement member formed by extrusion and the direction that the groove extends are made identical", "the lengthwise direction of the placement member and the direction that the groove extends are made identical", and so on.

Examples of the "placement member" can include a "member mounted on the upper surface of the roof material directly", a "member mounted on a supporting member mounted on the upper surface of the roof material", and a "member mounted on a portion of a supporting member mounted on a roof structural body (for example, roofboard or rafter) supporting the roof material, which extends upward from the roof material". It should be noted that metal such as aluminum alloy, iron, and iron alloy can be used as a material to form the placement member.

Further, examples of the "groove" on the placement member can include a "long hole-like groove having closed both ends in the extending direction", a "groove having a hole of which diameter is larger than the width thereof at one end of a portion extending at a constant width", a "groove having a hole of which diameter is larger than the width thereof at an intermediate position of a portion extending at a constant width, and a "groove of which at least one of both ends in the extending direction is opened". The "groove" may penetrate through the placement member in the up-down direction or may have a bottom without penetrating through the placement member in the up-down direction.

Further, examples of the "external thread portion" can include a "portion on an external thread member of which head portion having a large diameter is formed on one end of the external thread portion" and a "portion formed by the external thread portion only". Examples of the "internal thread portion" can include an "internal thread portion of a nut as an internal thread member" and an "internal thread portion formed in the groove of the placement member". In addition, as examples of a relation between the external thread portion and the internal thread portion, "the head portion having a large diameter, which is formed on the lower end of the external thread portion, is arranged in the placement member and the internal thread portion is screwed with the external thread portion from the upper end of the external thread portion", "the head portion having a large diameter is formed on the upper end of the external thread portion and the lower end of the external thread portion is screwed with the internal thread portion in the placement member", "the lower end of the external thread portion is screwed with the internal thread portion in the placement member and the internal thread portion is screwed with the external thread portion from the upper end of the external thread portion", and so on.

Further, a plurality of "shim members" having the same thickness may be prepared or a plurality of "shim members" having different thicknesses may be prepared. The "shim member" may have the thickness that changes from one side to the other side, that is, the "shim member" may have the upper surface that is inclined relatively to the lower surface (for example, wedge shape and trapezoidal shape). In addition, metal such as aluminum alloy, iron, and copper, a synthetic resin, or the like can be used as a material to form the shim member.

The "connecting member" desirably has the thickness smaller than that of the shim member. It is sufficient that a material having electrical conductive property is used as a material to form the connecting member. For example, metal such as stainless alloy, iron, aluminum alloy, and copper can be used. The connecting member that is harder than the shim member is desirably used.

Examples of the "securing member" can include a "member capable of simultaneously pressing a pair of solar cell modules placed so as to be separated to both sides of the direction that the groove extends with respect to the external thread portion", and a "member capable of pressing only the solar cell module placed so as to be separated to one side of the direction that the groove extends with respect to the external thread portion". It should be noted that metal such as aluminum alloy, iron, iron alloy, or the like can be used as a material to form the securing member.

According to the aspect of the invention, the height of the solar cell module can be changed by changing the number of shim members staked on the upper surface of the placement member installed on the roof material. This makes it possible to make adjustment of aligning heights of upper surfaces of the solar cell modules easily.

The slit of the shim member is opened to one side, thereby inserting the external thread portion into the slit through the opened portion. That is to say, even in a state where the external thread portion is inserted through the insertion hole of the connecting member on which the solar cell module is placed, the shim member can be inserted into between the placement member and the connecting member. Accordingly, the shim member can be inserted into between the connecting member and the placement member without detaching the connecting member below the solar cell module from the external thread portion. This enables the height of the solar cell module to be adjusted easily.

The upward projecting portions of the connecting member having the electrical conductive property are made to stick in the lower surface of the solar cell module placed so as to be separated from the external thread portion in the direction that the groove extends. Therefore, rainwater is difficult to be accumulated on the portions in which the upward projecting portions stick so as to suppress generation of electric corrosion as less as possible. This makes it possible to make the solar cell module be grounded (electrically connected) in a preferable state. Further, the generation of electric corrosion can be suppressed as less as possible as described above, so that (the frame body of) the solar cell module can be prevented from being corroded. This can suppress lowering of durability of the solar cell module. When the solar cell modules are placed on the upper surface of the connecting member at both sides with respect to the external thread portion, the upward projecting portions stick in the lower surfaces of the respective solar cell modules, so that the adjacent solar cell modules can be electrically connected to each other easily.

Further, the shim member includes the through-hole and the connecting member includes the droop portion drooping in the groove while passing through the through-hole of the shim member. Therefore, the droop portion abuts against an inner portion of the groove so as to prevent the shim member and the connecting member placed on the placement member from rotating. Accordingly, the plurality of upward projecting portions provided at both sides of the insertion hole can be made into a state of being separated in the direction that the groove extends reliably. This enables the upward projecting portions to stick reliably in the lower surface of the solar cell module placed so as to be separated from the external thread portion in the direction that the groove extends. With this, the solar cell module can be grounded in a preferable state.

In the securing structure for the solar cell module according to the aspect of the invention, in addition to the above-mentioned structure, it is preferable that "the upward projecting portions be arranged just above at least the upper surface of the placement member."

Meanwhile, if the upward projecting portions of the connecting member are arranged at positions other than the positions just above the upper surface of the placement member, that is, at positions just above the groove of the placement member or the positions at the outer side relative to the upper surface of the placement member, when the securing member presses the solar cell module downward (to the placement member), portions just under the upward projecting portions are not supported. Therefore, the upward projecting portions do not stick and the connecting member and the shim member are deformed due to pressing force acting on the upward projecting portions from the lower surface of the solar cell module depending on the thicknesses of the connecting member and the shim member. This arises a risk that the solar cell module cannot be grounded sufficiently.

For coping with this, in the aspect of the invention, the plurality of upward projecting portions of the connecting member are arranged just above at least the upper surface of the placement member. Therefore, the portions just under the upward projecting portions are supported by the upper surface of the placement member so as to prevent portions of the upward projecting portions from being deformed downward. This enables the upward projecting portions to stick in the lower surface of the solar cell module reliably. With this, the solar cell module placed so as to be separated from the external thread portion in the direction that the groove extends can be grounded reliably.

Further, in the securing structure for the solar cell module according to the aspect of the invention, in addition to the above-mentioned structure, it is preferable that "the connecting member further includes a downward projecting portion projecting downward and sticking in the shim member, and the shim member has a length longer than a length of the connecting member in the direction that the groove extends and further includes a screw hole penetrating through the shim member at an outer side relative to the connecting member."

According to the aspect of the invention, the connecting member includes the downward projecting portion sticking in the shim member and the shim member includes the screw hole at the outer position relative to the edge of the connecting member. Therefore, when a terminal mounted on the front end of a grounding conductor is screwed using the screw hole of the shim member in the state where the solar cell module is placed on the connecting member, the grounding conductor to be ground to the ground or the like can be mounted easily without screwing a terminal on the side surface or the like of the solar cell module.

According to the invention, there can be provided the solar cell module for the securing structure, which can make adjustment of aligning the height of the upper surface of the solar cell module easily and can make the solar cell module be grounded in a preferable state.

DESCRIPTION OF THE EMBODIMENTS

Figure 1:
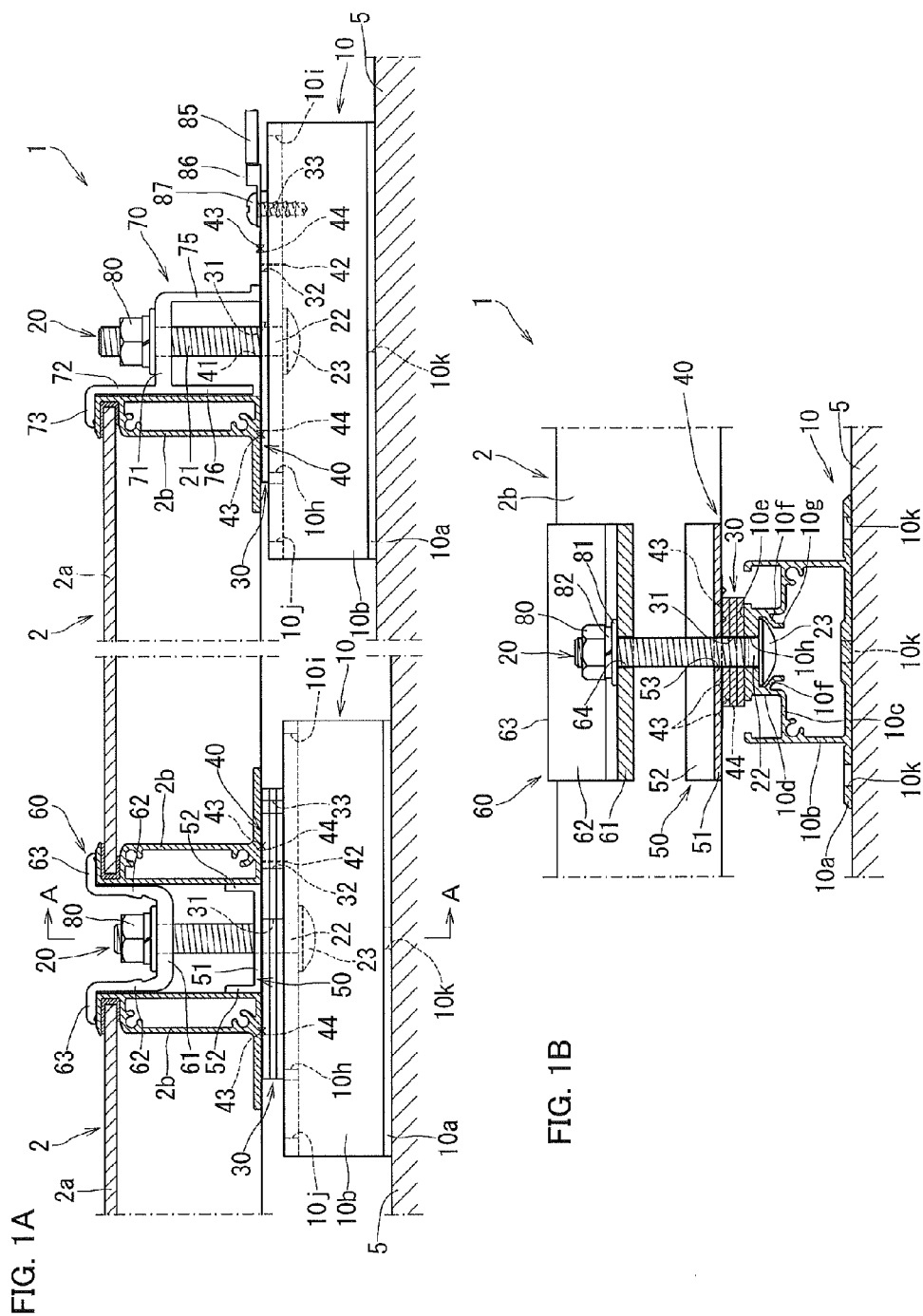
FIG. 1A is a side cross-sectional view illustrating a solar power generation system to which a securing structure for a solar cell module as an embodiment of the invention is applied.
FIG. 1B is a cross-sectional view cut along a line A-A in FIG. 1A.
Figure 2:
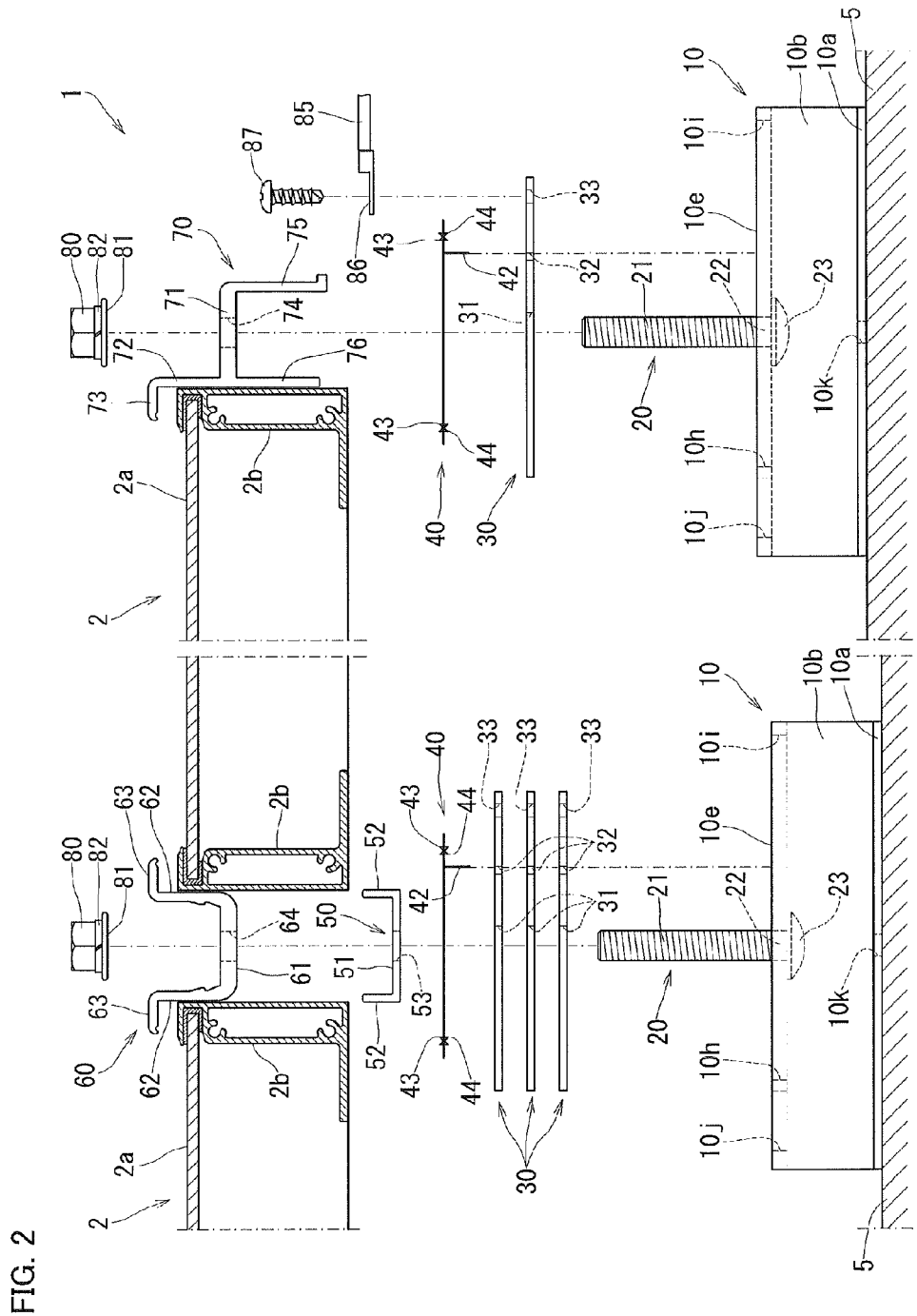
FIG. 2 is an exploded view illustrating the solar power generation system in FIG. 1A in an exploded manner into respective members.

A securing structure for a solar cell module according to an embodiment of the invention is described in detail with reference to FIG. 1A to FIG. 3. A solar power generation system 1 to which the securing structure for the solar cell module (hereinafter, also referred to as securing structure simply) in the embodiment is applied includes a plurality of solar cell modules 2 installed on a roof material 5. In the solar power generation system 1, the plurality of solar cell modules 2 are arranged in the roof flow direction and in the roof lateral direction (direction perpendicular to the flow direction) (not illustrated) in rows such that the upper surfaces thereof are in substantially the same plane. In the embodiment, the roof flow direction is assumed to be the direction that a groove in the embodiment extends.

As illustrated in Figs. 1A and 1B and the like, the solar power generation system 1 in the embodiment includes a plurality of placement members 10, external thread members 20, flat plate-like shim members 30, flat plate-like connecting members 40, and the solar cell modules 2. The placement members 10 are mounted on a roof material 5 configuring roof of a building. The external thread members 20 have external thread portions 21 extending upward from the upper surfaces of the respective placement members 10. The external thread portions 21 pass through the shim members 30 and at least one shim member 30 is stacked on the upper surface of each of the placement members 10. The connecting members 40 are placed on the upper surfaces of the shim members 30 and the external thread portions 21 pass through the connecting members 40. Further, the solar cell modules 2 can be placed on the connecting members 40 at both sides with respect to the external thread portions 21. The connecting members 40 have conductive property. The solar cell modules 2 are placed at least one side of the roof flow direction with respect to the external thread portions 21 passing through the connecting members 40.

In addition, the solar power generation system 1 includes positioning members 50, first securing members 60, second securing members 70, and internal thread members 80. The positioning members 50 are placed on the upper surfaces of the connecting members 40 and the external thread portions 21 pass through the positioning members 50. A positioning member 50 determines a distance between the solar cell modules 2 arranged the roof flow direction with respect to the external thread portions 21. The first securing members 60 are arranged above the positioning members 50 and the external thread portions 21 pass through the first securing members 60. The first securing members 60 can press downward the solar cell modules 2 arranged at both sides of the roof flow direction with respect to the external thread portions 21. The external thread portions 21 of other external thread members 20 pass through the second securing members 70. The second securing members 70 can press downward only the solar cell module 2 arranged at one side with respect to the external thread portions 21. The internal thread members 80 have internal thread portions (not illustrated) that are screwed with the external thread portions 21 from above the first securing members 60 and the second securing members 70.

The solar power generation system 1 includes plain washers 81 and spring washers 82. The plain washers 81 and the spring washers 82 are arranged between the internal thread members 80 and the first securing members 60 and between the internal thread members 80 and the second securing members 70. The external thread portions 21 of the external thread members 20 are inserted through the plain washers 81 and the spring washers 82. It should be noted that the internal thread members 80 in the embodiment are hexagon nuts. In addition, the solar power generation system 1 includes a grounding conductor 85 connected to the ground or the like, a terminal 86 mounted on the front end of the grounding conductor 85, and a screw 87 for mounting the terminal 86 on the shim member 30.

Next, the respective members of the solar power generation system 1 in the embodiment will be described in detail. First, each of the solar cell modules 2 of the solar power generation system 1 includes a plate-like solar cell panel 2a and a long frame body 2b. The solar cell panel 2a has a plurality of solar cells and an outer shape of the solar cell panel 2a is polygonal shape. The frame body 2b supports the outer periphery of the solar cell panel 2a. Although not illustrated in the drawings, the solar cell module 2 includes an output cable outputting electricity generated by the solar cell panel 2a and extending from the back side (lower side). Further, the solar cell module 2 in the embodiment has an outer rectangular shape (oblong shape) having long sides and short sides. The frame body 2b of the solar cell module 2 is extruded and made of aluminum alloy in the embodiment and includes a surface layer formed by an oxide film and a coating material on the surface thereof.

Figure 3:
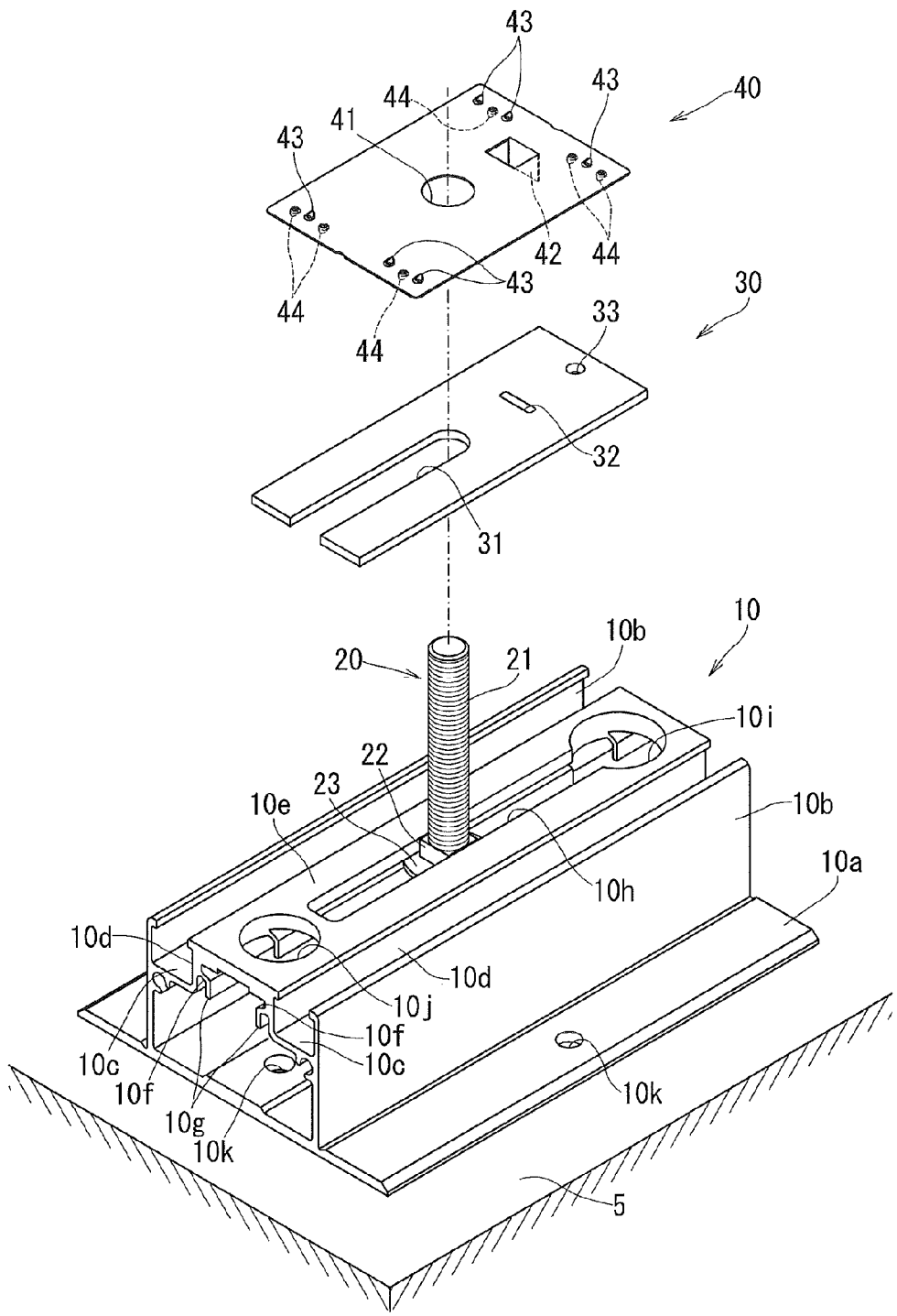
FIG. 3 is a perspective view illustrating a placement member, an external thread member, a shim member, and a connecting member in FIG. 1.

As illustrated in FIG. 1, each of the placement members 10 of the solar power generation system 1 includes a plate-like base portion 10a, a pair of outer wall portions 10b, a pair of outer top board portions 10c, a pair of inner wall portions 10d, a plate-like inner top board portion 10e, a pair of platforms 10f, and drooping wall portions 10g. The base portion 10a is placed on the roof material 5. The outer wall portions 10b extend upward from the base portion 10a. The outer top board portions 10c extend from the opposing side surfaces of the pair of outer wall portions 10b in the directions of being close to each other. The inner wall portions 10d extend upward from the opposing ends of the pair of outer top board portions 10c. The inner top board portion 10e connects the upper ends of the pair of inner wall portions 10d. The platforms 10f extend from the opposing side surfaces of the pair of inner wall portions 10d in the directions of being close to each other under the inner top board portion 10e. The drooping wall portions 10g extend downward from the opposing ends of the pair of platforms 10f. As illustrated in FIG. 3, the placement member 10 extends in one direction so as to have a substantially uniform cross-sectional shape.

In addition, each of the placement members 10 includes a groove 10h, an insertion hole 10i, and a through-hole 10j. The groove 10h penetrates through the inner top board portion 10e in the up-down direction and extends in the lengthwise direction. The insertion hole 10i communicates with the groove 10h at an end in the lengthwise direction, has a diameter larger than the width of the groove 10h, and penetrates through the inner top board portion 10e in the up-down direction. The through-hole 10j penetrates through the inner top board portion 10e in the up-down direction at the side opposite to the insertion hole 10i with respect to the groove 10h and at the outer side relative to the groove 10h. Further, the placement member 10 includes mounting holes 10k each of which penetrates through the base portion 10a in the up-down direction. The mounting holes 10k are provided on the base portion 10a at positions at substantially the center in the lengthwise direction and at the outer sides relative to the pair of outer wall portions 10b and positions substantially concentric to the insertion hole 10i and the through-hole 10j.

The pair of outer wall portions 10b of the placement member 10 extend upward at the slightly outer positions relative to positions of approximately ¼ of the width (dimension in the right-left direction in FIG. 1B) of the base portion 10a from both ends of the base portion 10a. The pair of outer wall portions 10b are slightly bent in the directions that the upper ends thereof make close to each other. Further, the width of each of the outer top board portions 10c of the placement member 10 is approximately ¼ of a distance between the pair of outer wall portions 10b.

Further, the inner top board portion 10e of the placement member 10 is formed such that the upper surface thereof is at the same height of the upper ends of the pair of outer wall portions 10b. The both ends of the inner top board portion 10e in the width direction extend to the outer sides relative to the inner wall portions 10d. The platforms 10f of the placement member 10 extend while being inclined downward toward the center of the placement member 10 in the width direction. A distance between the pair of drooping wall portions 10g of the placement member 10 is larger than the width of the groove 10h.

The groove 10h of the placement member 10 is formed at the center of the inner top board portion 10e in the width direction. The insertion hole 10i and the through-hole 10j of the placement member 10 have such diameters that head portions of mounting screws, washers, packing, and the like for mounting the placement member 10 on the roof material 5 through the respective mounting holes 10k formed just under thereof can pass through them.

A head portion of a carriage bolt or a flanged bolt having the external thread portion in the invention or a flanged nut having an internal thread portion that is screwed with the external thread portion in the invention is inserted into between the lower surface of the inner top board portion 10e and the pair of platforms 10f or the droop portion 10g, so that the placement member 10 in the embodiment can support them so as to slide in the lengthwise direction in a non-rotatable manner. To be specific, when the carriage bolt is inserted, the head portion thereof is located between the inner top board portion 10e and the platforms 10f and the opposing side surfaces of a carriage portion are made to abut against the side surfaces of the groove 10h, so that the placement member can support the carriage bolt so as to slide in a non-rotatable manner. Alternatively, when the flanged bolt or the flanged nut is inserted, a flanged portion thereof is located between the inner top board portion 10e and the platforms 10f and the opposing side surfaces of a portion having the outer circumferential surface of a polygonal shape are made to abut against the side surfaces of the pair of drooping wall portions 10g, so that the placement member 10 can support the flanged bolt or the flanged nut so as to slide in a non-rotatable manner.

Further, each placement member 10 in the embodiment includes recesses at the outer sides of the inner top board portion 10e in the width direction. The recesses are formed by the outer wall portions 10b, the outer top board portions 10c, and the inner wall portions 10d, and are opened upward. Output cables and the like extending from the solar cell modules 2 can be held by the recesses.

Each placement member 10 in the embodiment is formed by cutting an extruding molded material made of aluminum alloy into a necessary length and processing the groove 10h, the insertion hole 10i, the through-hole 10j, and the mounting holes 10k by cutting or the like. Further, the placement member 10 in the embodiment includes a surface layer formed by an oxide film and a coating material on the surface thereof.

As illustrated in FIG. 3, each external thread member 20 of the solar power generation system 1 includes the bar-shaped external thread portion 21, a carriage portion 22, and a head portion 23. A thread is formed on the outer circumference of the external thread portion 21. The carriage portion 22 is formed at one end of the external thread portion 21 and has the outer circumference of a polygonal shape (in this example, substantially square shape). The head portion 23 is formed at one end of the carriage portion 22 and has a diameter larger than that of the external thread portion 21. The external thread member 20 in the embodiment is a what-is-called carriage bolt. The width of the carriage portion 22 (diameter of the external thread portion 21) of the external thread member 20 is formed to be slightly smaller than the width of the groove 10h.

Each shim member 30 of the solar power generation system 1 is formed to be in an elongated flat plate form having a rectangular shape. The shim member 30 includes a slit 31, a through-hole 32, and a screw hole 33. The slit 31 penetrates through the shim member 30 at the center thereof in the width direction and is opened to one side in the lengthwise direction. The through-hole penetrates through the shim member 30 at the side opposite to the slit 31 in the lengthwise direction. The screw hole 33 penetrates through the shim member 30 at the outer side relative to the through-hole 32 in the lengthwise direction.

As illustrated in FIG. 3, the slit 31 is formed by cutting out the shim member 30 into a substantially U-shaped form. The width of the slit 31 (in the direction perpendicular to the lengthwise direction) is set to be substantially the same as the width of the groove 10h of the placement member 10. The through-hole 32 of the shim member 30 is formed into a square hole extending so as to have a length substantially the same as the width of the slit 31.

Note that each shim member 30 in the embodiment is formed by an aluminum plate having the thickness of 1 mm to 5 mm and includes a surface layer formed by an oxide film and a coating material on the surface thereof.

Each connecting member 40 of the solar power generation system 1 is a thin plate having a substantially rectangular shape and is made of a material having electrical conductive property. The connecting member 40 includes an insertion hole 41, a droop portion 42, a plurality of upward projecting portions 43, and a plurality of downward projecting portions 44. The insertion hole 41 penetrates through the connecting member 40 at the center and the external thread portion 21 can pass through the insertion hole 41. The droop portion 42 extends downward from a position at one side relative to the insertion hole 41 in the lengthwise direction. The upward projecting portions 43 project upward from positions in the vicinity of one and the other ends of the connecting member 40 in the lengthwise direction. The downward projecting portions 44 project downward from positions in the vicinity of one and the other ends of the connecting member 40 in the lengthwise direction.

As illustrated in FIG. 3, the droop portion 42 of the connecting member 40 is formed into a plate form extending in the direction perpendicular to the lengthwise direction and the downward direction. A distance to the droop portion 42 from the center of the insertion hole 41 corresponds to a distance from the center of a semicircular portion forming the closed end portion of the slit 31 of the shim member 30 to the through-hole 32. With this, the droop portion 42 of the connecting member 40 can pass through the through-hole 32 of the shim member 30 by making the center of the insertion hole 41 and the center of the semicircular portion of the slit 31 identical to each other.

The respective upward projecting portions 43 and the respective downward projecting portions 44 of the connecting member 40 are arranged at positions of which distances from the center of the insertion hole 41 are larger than distances from the center of the insertion hole 41 to the droop portion 42. The upward projecting portions 43 and the downward projecting portions 44 are alternately provided in rows along one and the other ends in the lengthwise direction. To be specific, as illustrated in FIG. 3, the plurality of upward projecting portions 43 and downward projecting portions 44 are provided in rows along the ends such that they are not formed on a portion in a range of the diameter of the insertion hole 41 along the center of the connecting member 40 in the width direction. Further, the upward projecting portions 43 and downward projecting portions 44 are arranged so as to be point-symmetric to each other with respect to the insertion hole 41.

Each connecting member 40 in the embodiment is formed to have the length smaller than that of the shim member 30 and the width larger than that thereof. The connecting member 40 is formed by a stainless plate having the thickness of 0.1 mm to 1 mm, which is smaller than that of the shim member 30. The droop portion 42 is formed by bending and the upward projecting portions 43 and the downward projecting portions 44 are formed by punching processing or burring processing.

Each positioning member 50 of the solar power generation system 1 includes a flat plate-like bottom plate 51, a pair of abutment pieces 52, and a passing hole 53. The abutment pieces 52 extend upward from both ends of the bottom plate 51. The passing hole 53 penetrates through the bottom plate 51 at the center between the pair of abutment pieces 52 and the external thread portion 21 of the external thread member 20 can pass through the passing hole 53. The pair of abutment pieces 52 of the positioning member 50 are formed at such positions that distances from the center of the passing hole 53 are smaller than the distance from the center of the insertion hole 41 to the droop portion 42 on the connecting member 40.

Each first securing member 60 of the solar power generation system 1 includes a flat plate-like board portion 61, a pair of standing wall portions 62, abutment portions 63, and a passing hole 64. The pair of standing wall portions 62 extend upward from both ends of the board portion 61. The abutment portions 63 extend in the directions of being separated from each other from the upper ends of the pair of standing wall portions 62 and can abut against the upper surfaces of the solar cell modules 2. The passing hole 64 penetrates through the board portion 61 at the center between the pair of standing wall portions 62 and the external thread portion 21 of the external thread member can pass through the passing hole 64. The first securing member 60 is formed such that a distance between the outer side surfaces of the pair of standing wall portions 62 is slightly smaller than that between the outer side surfaces of the pair of abutment pieces 52 of the positioning member 50.

Each second securing member 70 of the solar power generation system 1 includes a flat plate-like board portion 71, a standing wall portion 72, an abutment portion 73, a passing hole 74, a leg portion 75, and a lower wall portion 76. The standing wall portion 72 extends upward from one end of the board portion 71. The abutment portion 73 extends from the upper end of the standing wall portion 72 in the direction opposite to the board portion 71 and can abut against the upper surface of the solar cell module 2. The passing hole 74 penetrates through the board portion 71 at substantially the center and the external thread portion 21 of the external thread member 20 can pass through the passing hole 74. The leg portion 75 extends downward from the other end of the board portion 71. The lower wall portion 76 is slightly shorter than the leg portion 75 and extends downward from one end of the board portion 71. The second securing member 70 is formed such that the height from the lower surface of the abutment portion 73 to the lower end of the leg portion 75 is substantially the same as the height of the solar cell module 2.

The positioning members 50, the first securing members 60, and the second securing members 70 in the embodiment are formed by cutting an extruding molded material made of aluminum alloy into the length larger than the distance between the pair of outer wall portions 10b of the placement members 10, for example, and processing the respective passing holes 53, 64, and 74 by cutting or the like. Further, each of the positioning members 50, the first securing members 60, and the second securing members 70 in the embodiment includes a surface layer formed by an oxide film and a coating material on the surface thereof.

Subsequently, the securing structure for the solar cell modules 2 in the solar power generation system 1 in the embodiment will be described in detail together with a constructing method. First, on roof on which the solar power generation system 1 is installed, the plurality of placement members 10 are arranged at an appropriate interval to be mounted on the roof material 5 in accordance with the number of solar cell modules 2 to be installed, an installation pattern of solar cell modules 2, and the like. As the arrangement pattern of the placement members 10, for example, the placement members 10 are arranged at an interval corresponding to the length of the short sides of the solar cell modules 2 in the roof flow direction and are arranged at an interval at which the solar cell modules 2 can be secured at least two places on the long sides thereof in the roof lateral direction (direction perpendicular to the flow direction). One solar cell module 2 is secured by at least four placement members 10.

In the embodiment, slate or metal roof such as zinc roof is supposed as the roof material 5. The placement members 10 are mounted by screwing the mounting screws into the roofboard or the rafter of the roof material 5 through the mounting holes 10k from above the base portions 10a in a state where sheet-like sealing members made of butyl rubber, resin, or the like are interposed between the roof material 5 and the base portions 10a of the placement members 10.

When the placement members 10 are mounted on the roof material 5, the direction (lengthwise direction) that the grooves 10h of the placement members 10 extend is made identical to the roof flow direction and the insertion holes 10i are located at the ridge side relative to the grooves 10h.

Then, the external thread members 20 are inserted into the insertion holes 10i of the placement members 10 mounted on the roof material 5 in such direction that the head portions 23 thereof correspond to lower ends. Thereafter, the head portions 23 of the external thread members 20 are further inserted into between the inner top board portion 10e and the platforms 10f of the placement members 10 and are made to slide to the eaves side. This makes the external thread portions 21 of the external thread members 20 into a state of extending upward through the grooves 10h of the placement members and makes the external thread portions 21 into a state of being slidable by the length of the grooves 10h in the direction that the grooves 10h extend while the head portions 23 are supported between the inner top board portion 10e and the platforms 10f (see FIG. 3).

In the state where the head portions 23 of the external thread members 20 are supported between the inner top board portion 10e and the platforms 10f, the carriage portions 22 of the external thread members 20 are located in the grooves 10h. With this, the side surfaces of the carriage portions 22 abut against the side surfaces of the grooves 10h so as to restrict rotation of the external thread members 20 about the shaft cores of the external thread portions 21. This enables the external thread members 20 to be supported in a non-rotatable manner.

Thereafter, the external thread portions 21 of the external thread members 20 extending upward from the upper surfaces of the placement members 10 are inserted through the insertion holes 41 of the connecting members 40. In this case, the connecting members 40 are directed such that the droop portions 42 of the connecting members 40 extend downward (to the placement members 10) and are located at the ridge side relative to the insertion holes 41. The connecting members 40 are placed on the upper surfaces of the inner top board portion 10e of the placement members 10 such that the droop portions 42 of the connecting members 40 are inserted into the grooves 10h of the placement members 10.

Subsequently, the long side of the solar cell module 2 is placed on the placement members 10 mounted at the mosteaves side. To be specific, the long side of the solar cell module 2 is placed on the placement members 10 at the ridge side with respect to the external thread portions 21 extending upward. Then, the external thread portions 21 are inserted through the passing holes 74 in a state where the abutment portions 73 of the second securing members 70 are directed to the ridge side. In this state, the position of the solar cell module 2 is adjusted such that the side of the solar cell module 2 at the eaves side is substantially parallel with the eaves and the height thereof is adjusted such that the side of the solar cell module 2 at the eaves side is substantially parallel with the roof surface.

The adjustment of the height is performed mainly on the lower placement member 10 among the plurality of placement members 10 on which the solar cell module 2 is placed. To be specific, the solar cell module 2 placed on the placement member 10 of which height is adjusted is lifted together with the connecting member 40 and the second securing member 70 so as to form a space between the connecting member 40 and the placement member 10. Then, the necessary number of shim members 30 are inserted into between the connecting member 40 and the placement member 10. At this time, the external thread portion 21 is inserted into the slits 31 of the shim members 30 and the droop portion 42 of the connecting member 40 is inserted into the through-holes 32. With this, the droop portion 42 of the connecting member 40 passing through the through-holes 32 of shim members 30 is inserted into the groove 10h of the placement member 10. This makes the connecting member 40 and the shim members 30 be non-rotatable with respect to the placement member 10.

When the height of the side of the solar cell module 2 at the eaves side has been completely adjusted, the plain washers 81 and the spring washers 82 are put onto the external thread portions 21 from above the respective second securing members 70, and then, the internal thread members 80 are screwed with the external thread portions 21. Subsequently, the internal thread members 80 are fastened, so that the abutment portions 73 of the second securing members 70 press downward the solar cell module 2 at the eaves side so as to secure the solar cell module 2 onto the placement members 10. With this, the upward projecting portions 43 and the downward projecting portions 44 of the connecting members 40 are made to stick in the lower surface of (the frame body 2b of) the solar cell module 2 and the upper surfaces of the shim members 30 or the placement members 10.

For the placement members 10 for which heights are not required to be adjusted among the plurality of placement members 10, including the following procedure, the connecting members 40 are placed on the placement members 10 directly without arranging the shim member 30 between the placement members 10 and the connecting members 40 and the solar cell module 2 is secured.

Then, the height of the solar cell module 2 at the ridge side of which the eaves side has been secured is adjusted. In the same manner as described above, the necessary number of shim members 30 are inserted into between the connecting members 40 and the placement members 10. When the height of the solar cell module 2 at the ridge side has been completely adjusted, the external thread portions 21 extending upward from the placement members 10 are inserted through the passing holes 53 of the positioning members 50. Then, the external thread members 20 are made to slide along the grooves 10h, so that the shim members 30, the connecting members 40, and the positioning members 50 are made to slide to the eaves side together so as to cause the abutment pieces 52 of the positioning members 50 at the eaves side to abut against the side surface of the solar cell module 2 at the ridge side.

Subsequently, the subsequent solar cell module 2 is placed at the ridge side with respect to the external thread portions 21 on the connecting members 40 on which the solar cell module 2 has been placed at the eaves side and the side surface of the solar cell module 2 at the eaves side is made to abut against the abutment pieces 52 of the positioning members 50 at the ridge side. Then, the external thread portions 21 are inserted through the passing holes 64 of the first securing members 60 so as to cause the pairs of the abutment portions 63 of the first securing members 60 to abut against the solar cell modules 2 at the eaves side and the ridge side, respectively. Further, the plain washers 81 and the spring washers 82 are put onto the external thread portions 21 from above the first securing members 60, and then, the internal thread members 80 are screwed with the external thread portions 21.

Thereafter, the internal thread members 80 are fastened, so that the pairs of the abutment portions 63 of the first securing members 60 press downward the solar cell modules 2 at the eaves side and the ridge side (both sides with respect to the external thread portions 21) so as to secure the solar cell modules 2 onto the placement members 10. With this, the upward projecting portions 43 and the downward projecting portions 44 of the connecting members 40 are made to stick in the lower surfaces of (the frame bodies 2b of) the solar cell modules 2 and the upper surfaces of the shim members 30 or the like (see FIG. 1A).

When there is another solar cell module 2 to be arranged at the further ridge side, the above-mentioned operations are repeated. When the solar cell module 2 at the ridge side, which is arranged at the most-ridge side, is secured, the necessary number of shim members 30 are inserted into between the connecting members 40 and the placement members 10 so as to adjust unevenness of the solar cell module 2 in the same manner as described above. Thereafter, the external thread portions 21 extending upward are inserted through the passing holes 74 in the state where the abutment portions 73 of the second securing members 70 are directed to the eaves side so as to cause the abutment portions 73 to abut against the side of the solar cell module 2 at the ridge side.

Further, the plain washers 81 and the spring washers 82 are put onto the external thread portions 21, so that the internal thread members 80 are screwed with the external thread portions 21. Then, the internal thread members 80 are fastened, so that the abutment portions 73 of the second securing members 70 press downward the solar cell module 2 at the ridge side so as to secure the solar cell module 2 onto the placement members 10. With this, the upward projecting portions and the downward projecting portions 44 of the connecting members 40 are made to stick in the lower surface of (the frame body 2b of) the solar cell module 2 and the upper surfaces of the shim members 30 or the like (see FIG. 1A).

Thereafter, the screw 87 is screwed into the screw hole 33 of the shim member 30 placed on the upper surface of one placement member 10 among the plurality of placement members 10 arranged at the most-ridge side through the terminal 86 mounted on the front end of the grounding conductor 85, so that the terminal 86 is mounted on the shim member 30. With this, the solar power generation system 1 is completely installed on roof.

As described above, according to the embodiment, the heights of the solar cell modules 2 can be changed by changing the number of shim members 30 stacked on the upper surfaces of the placement members 10 installed on the roof material 5, so that adjustment of aligning the heights of the upper surfaces of the solar cell modules 2 can be made easily.

Further, the slits 31 of the shim members 30 through which the external thread portions 21 pass have shapes that they are opened to one side. Therefore, the shim members 30 can be inserted into between the connecting members 40 and the placement members 10 through the slits 31 at positions at which the centers of the shim members 30 are substantially identical to the external thread portions 21 in a state where the connecting members 40 are slightly lifted together with the solar cell modules 2 without detaching the connecting members 40 arranged under the solar cell modules 2 from the external thread portions 21. This enables adjustment of the heights to be made easily.

In addition, the upward projecting portions 43 of the connecting members 40 having electrical conductive property are made to stick in the lower surfaces of the solar cell modules 2. With this, rainwater is difficult to be accumulated on the portions in which the upward projecting portions 43 stick so as to suppress generation of electric corrosion as less as possible. This makes it possible to make the solar cell modules 2 be grounded in a preferable state. Further, the generation of electric corrosion can be suppressed as less as possible as described above, so that (the frame bodies 2*b* of) the solar cell modules 2 can be prevented from being corroded. This can suppress lowering of durability of the solar cell modules 2.

The upward projecting portions 43 are provided on the connecting members 40 at both sides with respect to the insertion holes 41 (external thread portions 21). Therefore, when the solar cell modules 2 are placed at both sides with respect to the external thread portions 21, the upward projecting portions 43 stick in the lower surfaces of the respective solar cell modules 2, so that the adjacent solar cell modules can be grounded (electrically connected) to each other easily.

Further, the shim members 30 include the through-holes 32 and the connecting members 40 include the droop portions 42 extending in the grooves 10*h* of the placement members 10 while passing through the through-holes 32 of the shim members 30. Therefore, the droop portions 42 abut against the inner portions of the grooves 10*h* so as to prevent the shim members 30 and the connecting members 40 placed on the placement members 10 from rotating. Accordingly, the plurality of upward projecting portions 43 provided on the connecting members 40 at both sides with respect to the insertion holes 41 (external thread portions 21) can be made into a state of being separated reliably in the roof flow direction that the grooves 10*h* extend. This enables the upward projecting portions 43 to stick in the lower surfaces of the solar cell modules 2 placed so as to be separated to the sides of the roof flow direction with respect to the external thread portions 21 reliably. With this, the solar cell modules 2 can be connected to each other in a preferable state.

In addition, the portions just under the upward projecting portions 43 of the connecting members 40 are supported by the upper surfaces of the placement members 10. Therefore, downward deformation of the portions of the upward projecting portions 43 formed in the connecting members 40 can be suppressed. Accordingly, the upward projecting portions 43 can be made to stick in the lower surfaces of the solar cell modules 2, thereby making the solar cell modules 2 be grounded reliably.

Moreover, the connecting members 40 include the downward projecting portions 44 sticking in the shim members 30 and the shim members 30 include the screw holes 33 at the outer side to the eaves side relative to the edges of the connecting members 40. Therefore, when the terminal 86 at the front end of the grounding conductor 85 is mounted on the screw hole 33 using the screw 87 in the state where the solar cell module 2 is placed on the connecting members 40, the grounding conductor 85 to be grounded to the ground or the like can be mounted easily without screwing the terminal on the side surface or the like of the solar cell module 2.

Further, the heights of the solar cell modules 2 can be easily adjusted by the shim members 30, so that the placement members 10 shorter than the short sides of the solar cell modules 2 can be employed as in the embodiment. This can reduce the cost for the placement members 10 in comparison with those that are long.

Hereinbefore, the invention has been described by using a preferred embodiment. However, the invention is not limited to the embodiment. As will be described below, various improvements and changes in design can be made within a range without departing from a scope of the invention.

For example, although the head portions 23 of the external thread members 20 are supported between the inner top board portion 10*e* and the platforms 10*f* of the placement members 10 and the external thread portions 21 are made to extend upward from the upper surfaces of the placement members 10 in the above-mentioned embodiment, the invention is not limited thereto. Alternatively, the following structure may be employed. That is, flanged nuts are supported between the inner top board portion 10*e* and the platforms 10*f* of the placement members 10 and external thread portions of bolts of which head portions are located above are screwed with the flanged nuts by causing them to pass through the grooves 10*h* from above the placement members 10. In this manner, the external thread portions are made to extend upward from the upper surfaces of the placement members 10. With this structure, even when the numbers of shim members 30 to be inserted into between the placement members 10 and the connecting members 40 is increased for adjusting the heights and the lengths of the external thread portions 21 become insufficient, the bolts can be exchanged to bolts having longer external thread portions easily.

In addition, although the shim members 30 having the same thickness are used for adjusting the heights in the above-mentioned embodiment, the invention is not limited thereto. Alternatively, the plurality of shim members 30 having different thicknesses may be used and the heights may be adjusted by combining the shim members 30 appropriately. Further, although the thicknesses of the shim members 30 are uniform, the invention is not limited thereto. Alternatively, the shim members 30 having wedge shapes or trapezoidal shapes of which thicknesses in the lengthwise direction change from one ends to the other ends may be employed. With this, for example, when the placement members 10 are mounted while the upper surfaces thereof are inclined with respect to the roof surface, the inclination can be adjusted by the shim members 30.

Moreover, although the placement members 10 are mounted on the roof material 5 directly in the above-mentioned embodiment, the invention is not limited thereto. Alternatively, the placement members 10 may be mounted on supporting portions and the like provided on the upper surface of the roof material 5, supporting portions mounted on a roof structural body (for example, roofboard or rafter) supporting the roof material 5, which extend onto the roof material 5, or the like.

Further, although the short placement members 10 that are shorter than the short sides of the solar cell modules 2 in the above-mentioned embodiment, the invention is not limited thereto. Alternatively, the long placement members 10 that are longer than at least the short sides of the solar cell modules 2 may be employed.

What is claimed is:

1. A securing structure for a solar cell module comprising:
a placement member installed on a roof material of a roof of a building and having a groove extending in one direction on an upper surface of the placement member;
an external thread portion extending upward through the groove of the placement member;
at least one flat plate-like shim member having a slit opened to one side of the shim member in the direction that the groove extends and a through-hole penetrating through the shim member at a second side opposite to the slit, and stacked on the upper surface of the placement member;
a flat plate-like connecting member placed on an upper surface of the shim member, having an insertion hole through which the external thread portion passes, a droop portion drooping in the groove of the placement member through the through-hole of the shim member at an outer side relative to the insertion hole, and a plurality of upward projecting portions projecting upward from opposing positions spaced away from the insertion hole in the direction that the groove extends and sticking in a lower surface of the solar cell module so as to be separated from the external thread portion in the direction that the groove extends, and the connecting member being made of an electrically conductive material; and a securing member abutting against an upper surface of the solar cell module, the solar cell module placed on the connecting member, and the securing member pressing downward on the solar cell module with the external thread portion screwed into an internal thread portion of the securing member.

2. The securing structure for the solar cell module according to claim 1, wherein the upward projecting portions are arranged just above at least the upper surface of the placement member.

3. The securing structure for the solar cell module according to claim 2, wherein the connecting member further includes a downward projecting portion projecting downward and sticking in the shim member, and the shim member has a length longer than a length of the connecting member in the direction that the groove extends and further includes a screw hole penetrating through the shim member at an outer side relative to the connecting member.

4. The securing structure for the solar cell module according to claim 1, wherein the connecting member further includes a downward projecting portion projecting downward and sticking in the shim member, and the shim member has a length longer than a length of the connecting member in the direction that the groove extends and further includes a screw hole penetrating through the shim member at an outer side relative to the connecting member.

* * * * *